(12) United States Patent
Wenig et al.

(10) Patent No.: US 11,071,244 B2
(45) Date of Patent: Jul. 27, 2021

(54) DEVICE AND METHOD FOR COATING SEED

(71) Applicant: BAYER CROPSCIENCE AG, Monheim am Rhein (DE)

(72) Inventors: Guido Wenig, Leverkusen (DE); Heinz-Friedrich Schnier, Leverkusen (DE); Hartwig Kempkes, Overath (DE); Anja Ehrig, Leverkusen (DE); Hans-Jürgen Mandt, Cologne (DE)

(73) Assignee: BAYER CROPSCIENCE AG, Monheim am Rhein (DE)

( * ) Notice: Subject to any disclaimer, the term of this patent is extended or adjusted under 35 U.S.C. 154(b) by 216 days.

(21) Appl. No.: 15/562,780

(22) PCT Filed: Apr. 1, 2016

(86) PCT No.: PCT/EP2016/057223
§ 371 (c)(1),
(2) Date: Sep. 28, 2017

(87) PCT Pub. No.: WO2016/162281
PCT Pub. Date: Oct. 13, 2016

(65) Prior Publication Data
US 2018/0271004 A1    Sep. 27, 2018

(30) Foreign Application Priority Data

Apr. 9, 2015 (EP) .................................. 15162932

(51) Int. Cl.
*A01C 1/06* (2006.01)
*A01C 1/08* (2006.01)
*B05C 3/08* (2006.01)

(52) U.S. Cl.
CPC .................. *A01C 1/06* (2013.01); *A01C 1/08* (2013.01); *B05C 3/08* (2013.01)

(58) Field of Classification Search
CPC ............................. A01C 1/06–08; B05C 3/08
See application file for complete search history.

(56) References Cited

U.S. PATENT DOCUMENTS

| | | | | |
|---|---|---|---|---|
| 1,651,390 A | * | 12/1927 | Hersman | A01C 1/08 118/63 |
| 4,117,801 A | * | 10/1978 | Dannelly | A01C 1/08 118/20 |

(Continued)

FOREIGN PATENT DOCUMENTS

| | | |
|---|---|---|
| DE | 25 51 579 A1 | 5/1977 |
| DE | 91 10 546 U1 | 6/1992 |
| DE | 41 28 258 A1 | 2/1993 |

OTHER PUBLICATIONS

European Patent Office, English language version of the International Search Report, Form PCT/ISA/210 for International Application PCT/EP2016/057223 (3 pages).

*Primary Examiner* — Dah-Wei D. Yuan
*Assistant Examiner* — Stephen A Kitt
(74) *Attorney, Agent, or Firm* — Pauley Erickson & Swanson

(57) ABSTRACT

A device for coating seeds with a liquid dressing solution, including a housing delimiting a chamber for accommodating the seeds, a rotating system for mixing the seeds and the dressing solution, an air duct for feeding hot air into the chamber and a separating unit which is permeable to the hot air and separates the air duct from the chamber. According to this invention, the separating unit includes at least one perforated metal sheet that has an inner face facing towards the chamber, an outer face facing towards the air duct and a plurality of projections, wherein a projection rises obliquely in the direction of the outer face and forms an opening inlet, (Continued)

which is inclined to the metal sheet plane, on the outer face. This invention further relates to a method in which the device is used.

25 Claims, 3 Drawing Sheets

(56) References Cited

U.S. PATENT DOCUMENTS

| | | | | |
|---|---|---|---|---|
| 5,334,244 A | * | 8/1994 | Bohle | A23G 3/26 |
| | | | | 118/19 |
| 5,721,012 A | | 2/1998 | Long, Jr. et al. | |
| 2009/0092752 A1 | * | 4/2009 | Brandt, Jr. | A23G 3/0095 |
| | | | | 427/212 |
| 2010/0267554 A1 | * | 10/2010 | Madsen | A01C 1/06 |
| | | | | 504/100 |

* cited by examiner

DEVICE AND METHOD FOR COATING SEED

BACKGROUND OF THE INVENTION

Field of the Invention

This invention relates to a device for coating seeds with a liquid dressing solution and a method in which the device is used.

Discussion of Related Art

A known device with a housing delimiting a chamber for accommodating the seeds is taught by German Patent Reference DE 41 28 258 A1. This device includes a rotating system for mixing seeds and dressing solution in the form of a rotor that is rotatable about a vertical axis of rotation. Seeds are set in rotation and mixed in the chamber by the rotor. The dressing solution is applied to the seeds by nozzles. The device includes an air duct for feeding hot air into the chamber in order to dry the seeds coated with the dressing solution. The hot air is fed through a separating unit, which is permeable to the hot air and separates the air duct from the chamber, by the air duct. In this case, the separating unit has an annular screening surface through which the hot air reaches the chamber.

During the operation of the device, when the seeds are moved within the chamber by the rotor and are sprayed with the liquid dressing solution, the seeds slide along the annular screening surface. In the process, the individual seed grains wetted with the liquid dressing solution are dried by the hot air flowing through the annular screening surface.

With the hot air feed, the time required for coating and the subsequent drying can be significantly reduced as compared to a coating device without a hot air feed. It was found, however, that dust is emitted due to the operation of the device, which, depending on the dressing solution used, may pose a health risk and should therefore be avoided if possible. In addition, the individual holes in the screen of the annular screening surface become clogged over time, so that drying by hot air is made difficult and the device thus works less efficiently.

SUMMARY OF THE INVENTION

Thus, this invention is based on one object of providing a device for coating seeds that emits as little dust as possible and can be operated efficiently.

This object and others on which this invention is based are achieved with the combination of features discussed in this specification and in the claims.

According to the claims, the separating unit includes at least one perforated metal sheet that has an inner face facing towards the chamber, an outer face facing towards the air duct and a plurality of projections, wherein a projection rises obliquely in a direction of the outer face and forms an opening inlet, which is inclined to the metal sheet plane, on the outer face. Through the opening inlet, the hot air moves from the air duct into one of the openings in the perforated metal sheet and then flows through an opening outlet of the opening into the chamber.

The outer face is uneven and roughened due to the outwardly protruding projections, and the inner face of the perforated metal sheet is practically not roughened by the projections. The individual opening outlets are now located on the inner face. In this case, an opening outlet is delimited by a peripheral rim, which does not protrude anywhere on the inner face of the metal sheet from the metal sheet plane.

Because the projection rises sharply in the direction of the outer face, the rim delimiting the opening outlet has a strongly rounded edge, or smooth transition, from the metal sheet plane to the projection. A significantly reduced abrasion of the individual seed grains wetted or coated with the dressing solution can thus be achieved, which rub along the perforated metal sheet during the operation of the device. It was found that, in the device with the annular screening surface known from the prior art, a not inconsiderable proportion of the dust emission can be ascribed to the abrasion of the seed grains caused by precisely the annular screening surface. The particular shape of the perforated metal sheet has thus proved to be an effective option for reducing dust emission.

With the liquid and generally aqueous dressing solution, the seeds or individual seed grains, such as grains of maize, can be coated with a plant protecting agent. Thus, the dressing solution may contain plant protecting agents and/or also other active substances/colorants that may be relevant for the protection or the development of the seed grain. In particular, the dressing solution may also contain ingredients that provide for a good bond between the dressing solution and the seed grain to be coated.

In one embodiment of this invention, the housing substantially comprises a cylindrical housing part, with the perforated metal sheet being inserted into a jacket surface of the cylindrical housing part. Preferably, the cylindrical housing part is a stationary housing part that does not move during the operation of the device.

The housing may comprise a rotatable housing part, which is located below the cylindrical housing part in one embodiment of this invention. The rotatable housing part may substantially have the shape of a truncated cone oriented in a downward direction. In this case, the rotatable housing part is mounted so that a vertical axis of rotation coincides with a cone axis of the truncated cone. The downwardly oriented truncated cone may form a circular base of the chamber to which the cone envelope surface adjoins with a certain opening angle. The cylindrical housing part may adjoin to an upper rim of the cone envelope surface, wherein a diameter of the cylindrical housing part may correspond to the diameter of the truncated cone at the upper rim. If seeds of a plurality of individual seed grains are located in the truncated cone, the seed grains located therein are also set in rotation by the rotation of the truncated cone. The individual seed grains are pressed radially outwards against the cone envelope surface, which is also rotating, by the centrifugal forces arising at that time. In the process, they move upwards along the obliquely extending cone envelope surface and then, moving primarily in the circumferential direction, slide or rub along the stationary inner wall of the cylindrical housing part. In the process, they also slide along the perforated metal sheet through which hot air for drying the seed grains wetted with the dressing solution flows.

In one embodiment of this invention, a main axis of the projection substantially extends in the circumferential direction of the jacket surface. Thus, the main axis is oriented approximately parallel to the direction in which the seed grains slide along the inner face of the perforated metal sheet. In the process, a seed grain sliding along the inner face of the profiled metal sheet preferably first passes a comparatively sharp edge of the rim of the opening outlet, which, however, is not particularly relevant with regard to abrasion. Then, it passes the strongly rounded edge of the rim of the opening outlet. The special shaping of the rim caused by the obliquely rising projection does not result in any sharp-edged contact surfaces for the seed grains that could lead to a high level of abrasion. This is not only conducive to the reduction of the dust emission but also prevents the individual holes in the perforated metal sheets from clogging up after a short time. Thus, the dust emissions can be reduced and the operating life of the air-permeable separating unit can be increased by the special shaping of the perforated metal sheet.

The cross section of the opening inlet of the projection may be substantially triangular or semi-elliptical. Alternatively or additionally, the projection may substantially be triangular or semi-elliptical also in a top view. On the one hand, an opening inlet that is large in its flow cross section can be realized due to, in the top view, a triangular or semi-elliptical shape. On the other hand, this means for the rounded edge of the rim of the opening inlet that it is also rounded in the direction of the peripheral rim. In one embodiment of this invention, a punched sheet currently sold in Germany under the brand name CONIDURS™ is used as the perforated metal sheet.

The air duct may be configured as an annular duct extending in the circumferential direction around the jacket surface of the cylindrical housing part. With the exception of a possible discharge flap, the annular duct may extend over the entire circumference of the jacket surface of the cylindrical housing part (such as 360°).

The perforated metal sheet may be a ring segment, with several ring segments preferably disposed one behind the other in the circumferential direction. If, for example, the annular duct extends over 300° in the circumferential direction, the angle range covered by the ring segments that are disposed one behind the other in the circumferential direction may also be 300°. Thus, hot air can be guided directly towards the seeds rotating in the chamber over almost the entire circumference in the area of the cylindrical housing part. For example, three ring segments are provided, with each ring segment covering an angle range of 90° to 120°.

The housing may have a lid so that the chamber can be sealed from the top. In some embodiments in which the housing comprises the cylindrical housing part, the lid adjoins to an upper rim of the jacket surface of the cylindrical housing part.

One or more guide vanes for the seeds may be provided, by which the seeds are better mixed in order to achieve a wetting or coating with the dressing solution that is as uniform as possible and an efficient drying. Preferably, they are stationary guide vanes attached to the inner face of the cylindrical housing part or to the inner face of the lid. During operation of the device, when the rotatable housing part rotates, the seeds are pressed so far up that they move into the stationary guide vanes that divide the seeds into individual seed strands.

In one embodiment of this invention, two guide vanes are disposed on the inner face of the cylindrical housing part, which are disposed offset by 180° in the circumferential direction. The two guide vanes may also be disposed so that, viewed in the direction of rotation, they are unequally spaced from each other, such as not by 180° in each case, but, for example, by 160° and 200°, in each case based on a reference point of a guide vane, so that the sum of the distances of the guide vanes is always 360°. In the case of three or several guide vanes, the distances among them in the circumferential direction may also be of the same or a different size. Given three guide vanes, for example, the respective distances may in each case be 120° or deviate from this (such as 100°, 120° and 140°).

An inner space of the guide vane may form a part of the air duct. The perforated metal sheet may be inserted into an outer wall of the guide vane, by which the inner space of the guide vane is delimited. Thus, the guide vane is supplied with hot air, which then flows through the perforated metal sheet into the chamber.

Preferably, the outer wall with the perforated metal sheet constitutes the guide wall of the guide vane. In this case, the guide wall is the wall of the guide vane which, during the operation of the device, comes into contact with the seeds, along which the seeds slide and which thus imparts a corresponding change of direction to the seeds. Viewed in the main direction of movement of the seeds, the guide wall may be attached to the inner face of the cylindrical housing part and extend away from the cylindrical inner face in the radial direction with a slightly curved or spiral-shaped form and extending towards the inside.

The air duct may include a tube section that leads into the inner space of the guide vane from above. Alternatively or additionally, hot air may enter the inner space of the guide vane also through openings disposed on a rear wall of the guide vane. In some embodiments in which the guide vane is attached to the inner face of the cylindrical housing part, the inner face of the cylindrical housing part and the rear wall may rest flush against each other. That means the curvature of the cylindrical housing part corresponds to the curvature of the rear wall of the guide vane.

The cross section of the guide vane may be constant over its height. In this case, the perforated metal sheet does not have to extend over the entire height of the guide wall but may extend, for example, only over a lower third or over a lower half of the guide vane. Thus, the hot air leaks from the guide vane only in the region that comes into direct contact with the majority of the seeds during the operation of the device.

A rotating disc atomizer may be provided for atomizing or finely distributing the liquid dressing solution. The axis of rotation of the disc atomizer preferably coincides with the axis of rotation of the rotatable housing part. In operation, the liquid dressing solution is preferably applied onto the rotating disc atomizer from above. Due to the rotation of the disc atomizer, the dressing solution hitting it is atomized into fine droplets. Due to the rotation of the disc atomizer, the droplets are thrown radially outwards against the seeds. The plane in which the disc atomizer lies may in this case be located in the region of the truncated cone.

The device may include an air treatment system that has an inlet for discharged air from the chamber and an outlet connected to the air duct. Thus, a closed circuit of the air, which is routed through the chamber, is possible. Preferably, the air treatment system has a filter unit for dust separation, a water separator and an air heating device. Preferably, the dust-laden discharged air first comes from the chamber into the filter unit of the air treatment system, where dust particles are separated from the air flow. Then, the air cleaned in this manner reaches a water separator, with water being separated by condensation, preferably through lowering the temperature. Then, the cleaned and dried air reaches an air heating device in order to bring the air back up to the intended drying temperature. Then, the filtered, dried and re-heated air is introduced into the air duct, from where it is deployed through the perforated metal sheet for drying the seeds in the chamber. Because little abrasion and thus little dust is produced already in the chamber, the production of dust particles in the filter unit is correspondingly small. Not only can an energy-efficient drying process be achieved by the closed air circuit, but it is also possible to make important process parameters, such as the hot air temperature, residual moisture of the hot air and the like independent of the position and location of the device and the weather conditions prevailing there.

A part of the filtered, dried and re-heated air from the air treatment system may be guided into the chamber through an annular gap between the cylindrical housing part and the rotatable housing part. It can thus be avoided that the dust-laden discharged air escapes from the chamber into the environment through the annular gap. In addition, the effectivity of the drying process can be increased further by feeding the conditioned air from the air treatment system through the annular gap.

According to another object of this invention, the provision of a method for coating seeds, according to this specification and the claims. A device in one of the embodiments described is used, wherein the rotating system for mixing seeds and dressing solution are set in rotation, wherein the seeds are moved along the inner face of the perforated metal sheets by the rotating system, and wherein the obliquely rising projections substantially oppose the main direction of movement of the seeds, so that it is prevented that the seeds hit sharp edges while moving along the inner face of the metal sheet. The direction of rotation of the rotating system, and thus the direction of rotation of the seeds, and the projections are orientated in such a way that the seeds on the inner face of the perforated metal sheet first slide along the comparatively sharp edge of the rim of the opening outlet, wherein this sharp edge, however, does not pose an obstacle viewed in the direction of movement. After passing this rather uncritical edge, the seed grain passes the more strongly rounded edge of the rim. The abrasion of the seeds, and thus the dust emission, can be significantly reduced by such an orientation of the perforated metal sheet relative to the main direction of movement of the seeds. In addition, the danger of the perforated metal sheet clogging up with the abraded material can be significantly reduced.

BRIEF DESCRIPTION OF THE DRAWINGS

This invention is explained in more detail in view of exemplary embodiments shown in the drawings, wherein.

DETAILED DESCRIPTION OF THE INVENTION

Figure 1:
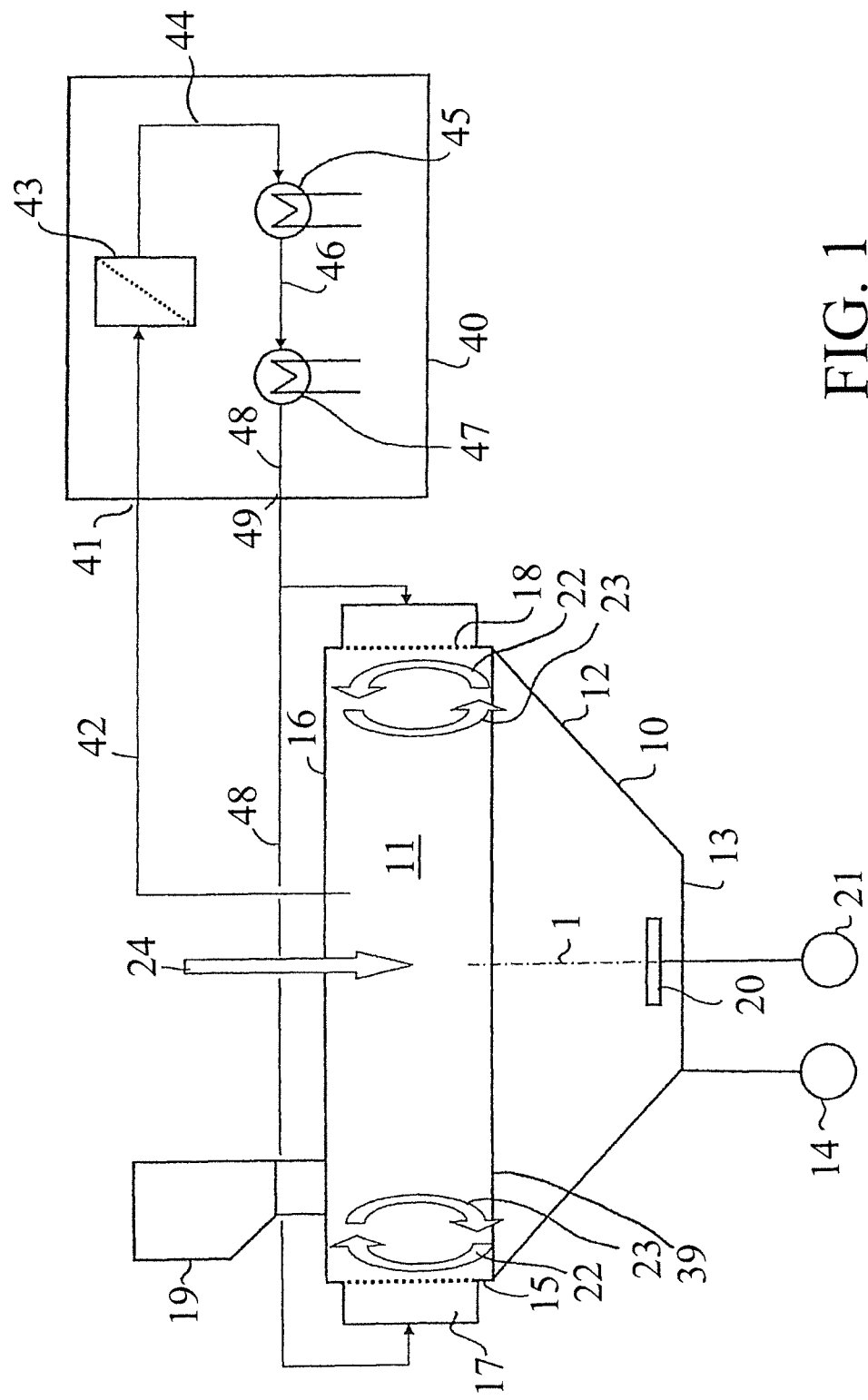
FIG. 1 schematically shows a device for coating seeds.

FIG. 1 schematically shows a device for coating seeds. The device comprises a housing 10 defining a chamber 11 for accommodating the seeds. Furthermore, the device comprises an air treatment system 40 which will be discussed later.

The housing 10 comprises a rotatable housing part 12 which is configured as a truncated cone in the exemplary embodiment illustrated here. The rotatable housing part of the truncated cone 12 has a lower circular end face 13, which may also be referred to as the chamber base. The housing part 12 is mounted so as to be rotatable about a vertical axis of rotation 1 and is driven by a motor 14. Above the rotatable housing part 12, a stationary, cylindrical housing part 15 is disposed whose inner diameter corresponds to the diameter of the conically shaped housing part 12 at the upper rim. The chamber 11 is sealed towards the top by a lid 16.

An air duct 17 in the form of an annular duct extends around the cylindrical housing part 15 in the circumferential direction. An air-permeable separating unit comprising a perforated metal sheet 18 is provided between the air duct 17 and the chamber 11. Hot air from the air duct 17 can flow through the perforated metal sheet 18 into the chamber 11 in order to dry the seeds located therein. However, the metal sheet 18 prevents seeds from getting into the air duct 17 from the chamber 11.

The chamber 11 can be filled with seeds from a bunker 19. For example, the chamber 11 may be filled with seeds in such a way that the seeds take up approximately half of the volume defined by the truncated cone 12. In the case of a non-rotating housing part 12, a disc atomizer 20 for the dressing solution would be completely covered by the seeds. Like the rotatable housing part 12, the disc atomizer 20 is driven by a motor 21. In this case, the disc atomizer 20 also rotates about the axis of rotation 1.

If the lower rotatable housing part 12 is now set in rotation by the motor 14, the individual seed grains located in the housing part 12 also rotate. Due to the centrifugal force, they are pressed against the cone envelope surface and move upwards along the cone envelope surface in the direction of the cylindrical housing part 15. In the process, the seeds are guided past the perforated metal sheet 18, with the main movement of the individual seeds being directed in the circumferential direction. This means that, relative to the stationary perforated metal sheet 18, the individual seeds slide or rub along it in the circumferential direction. In the process, the individual seed grains lose kinetic energy so that they fall back into the rotating housing part 12, as indicated by the arrows 22, 23. There, they are accelerated again in the circumferential direction and pressed against the inner wall of the cylindrical housing part 15 or against the perforated metal sheet 18 due to the centrifugal force. The agitation of the seeds indicated by the arrows 22, 23 may be assisted by guide vane not illustrated here.

In order to coat the seeds, the dressing solution is applied to the disc atomizer 20, which now is exposed, from above through the lid. The introduction of the dressing solution through the lid 16 is represented by the arrow 24. In the process, the liquid dressing solution hits/drips onto the rotating disc atomizer 20, by which the dressing solution is atomized into many small droplets, from above. Due to the centrifugal force, the individual droplets are thrown radially outwards against the seeds, which, as described above, are located on the cone envelope surface or the inner face of the cylindrical housing part 15. The agitation of the seeds within the chamber 11 results in a good thorough mixing of the seeds with the dressing solution so that the individual seed grains are uniformly coated with the dressing solution. The seeds with the dressing solution applied thereto are dried by the hot air from the air duct 17.

Figure 2:
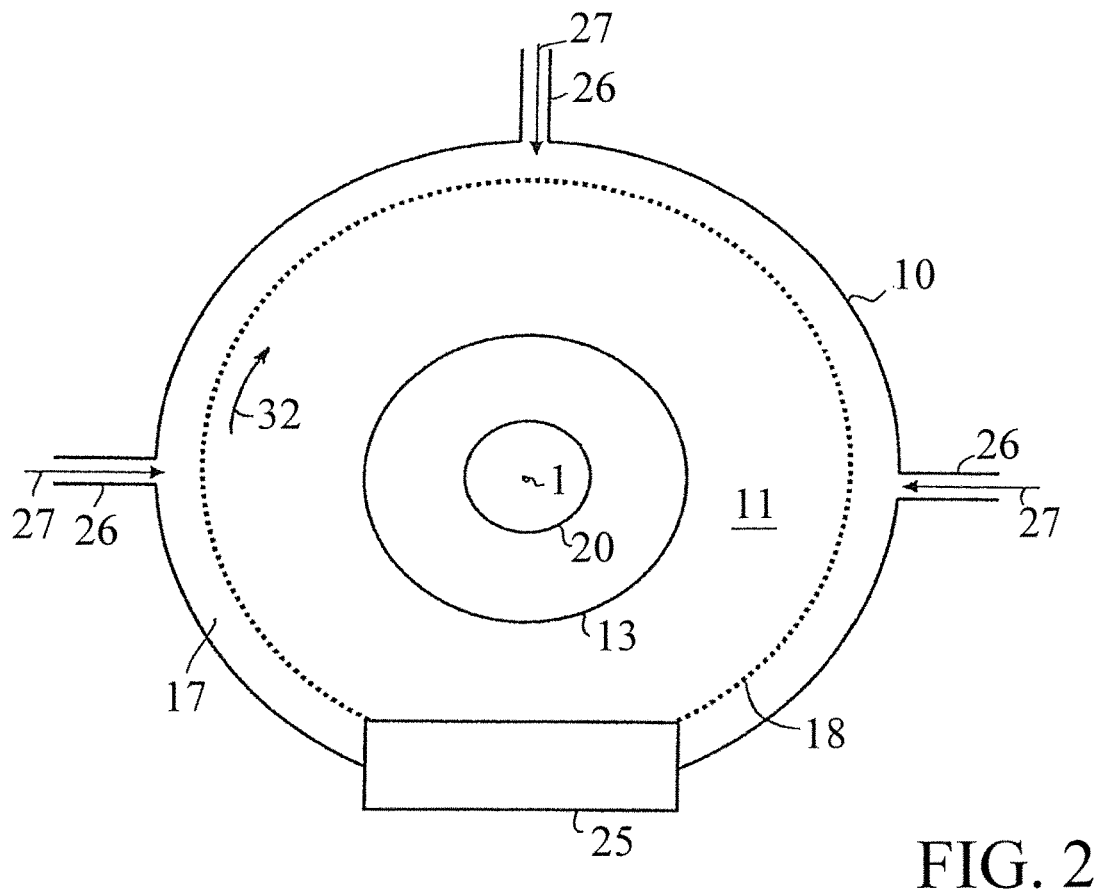
FIG. 2 shows a top view of a chamber of the device of FIG. 1.

FIG. 2 shows the chamber 11 from above. The substantially rotationally symmetric configuration of the housing 10 can be recognized. After the coating and drying has been completed, the chamber 11 can be emptied via a discharge flap 25. The perforated metal sheet 18 is configured in an annular manner and, with the exception of the angle range covered by the discharge flap 25, extends over the entire circumference of the cylindrical housing part 15. The air duct 17, which reaches around the cylindrical housing part 15 radially, also substantially extends over the entire circumference of the housing part 15. Via three duct inlets 26 offset by 90°, hot air (see arrow 27) gets into the air duct 17 and then enters the chamber 11 through the metal sheet 18.

Figure 3:
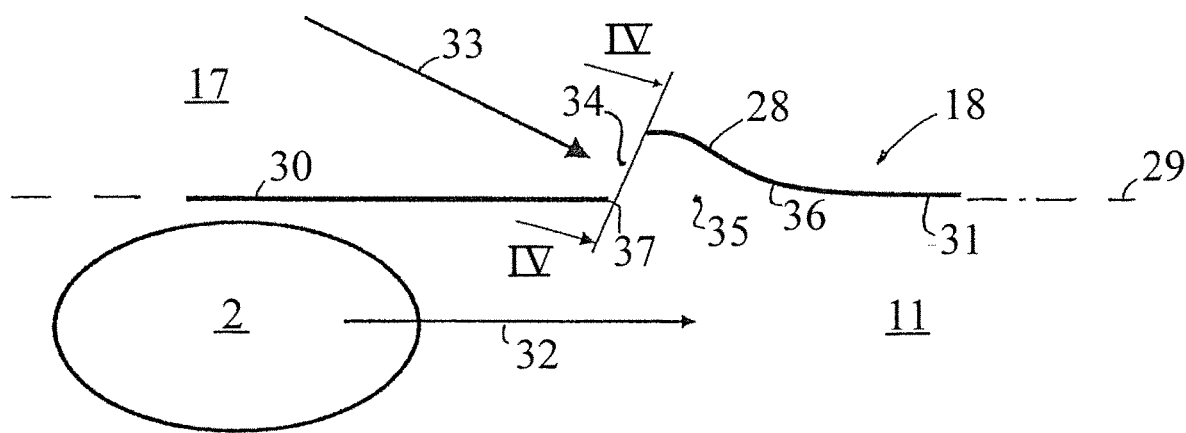
FIG. 3 schematically shows a projection of a perforated metal sheet used in the device of FIG. 1.

The structure of the perforated metal sheet 18 is described in more detail with reference to the FIGS. 3 to 5. The perforated metal sheet 18 comprises a plurality of projections 28 arranged in a pattern (see FIG. 5). FIG. 3 shows a small section of the perforated metal sheet 18. A single projection 28, which extends out from a metal sheet plane 29, can be seen in cross section. In this case, the projection points in the direction of an outer face 30. In the installed position, the outer face 30 of the perforated metal sheet 18 faces towards the air duct 17. An inner face 31 of the perforated metal sheet 18 is directed towards the chamber 11. It is free from any raised portions and therefore smooth and even as compared with the outer face 30. FIG. 3 shows an individual seed grain 2 located in the chamber 11. Arrow 32 in FIG. 3 indicates the main direction of movement of the seed grain 2 relative to the stationary metal sheet 18. Primarily, the main direction of movement 32 of the seed grain 2 is a rotary movement about the axis of rotation 1 (see arrow 32 in FIG. 2). The seed grain 2 is pressed by the centrifugal forces against the inner face 31 of the perforated metal sheet 18 and thus rubs along it.

Figure 4:
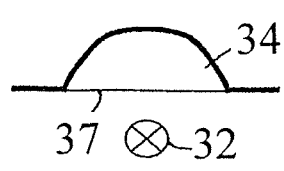
FIG. 4 shows a section taken along line IV-IV in FIG. 3.

When viewed in the direction of the flow of the hot air through the perforated metal sheet 18 (see arrow 33), an opening inlet 34, which is shown from the front in FIG. 4, is created by the projection 28. The opening inlet 34 is inclined by about 70° to the metal sheet plane 29 in the exemplary embodiment of FIG. 3. It has an approximately semi-elliptical cross section (see FIG. 4). In addition, FIG. 4 shows the main direction of movement 32 of the seed grain 2, which, in the illustration of FIG. 4, protrudes into the plane of the drawing. An opening outlet 35, which is also approximately semi-elliptical and whose basic contour is apparent from the illustration of FIG. 5, is formed in the metal sheet plane 29 on the inner face 31 by the projection 28. The projection 28, which rises obliquely relative to the outer face 30, and the semi-elliptical basic shape of the opening outlet 35, which lies in the metal sheet plane 29, results in a rear edge 36, viewed in the main direction of movement 32 of the seed grain 2, which is strongly rounded or provides for a smooth transition between the metal sheet plane 29 and the projection 28. When the seed grain 2 is moved along the perforated metal sheet 18 and is pressed against it by the centrifugal force, it first passes a lower edge 37 of the opening inlet 34. This edge 37 is comparatively sharp-edged but plays a minor part with respect to the abrasion of the seed grain. Then, the seed grain 2 hits the rear edge 36 which, however, is strongly rounded and thus goes easy on the seed grain with regard to abrasion. Also, no abrasion residues, which could result in the opening between the outer face 30 and the inner face 31 clogging up, are able to form at the edge 36 due to the smooth shaping.

Figure 5:
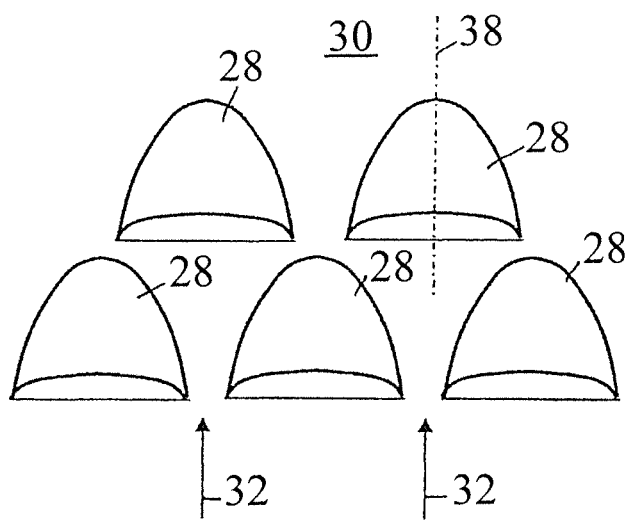
FIG. 5 shows a detail of the perforated metal sheet in the top view.

From FIG. 5, which shows the outer face 30 of the perforated metal sheet 18 in a top view, it becomes apparent that a main axis 38 of each projection 28 is orientated parallel or substantially parallel to the main direction of movement 32 of the seed grain 2. It also becomes apparent that, when viewed in the main direction of movement 32, the rear edge 36 that is critical with regard to the abrasion is in each case strongly rounded and thus rendered harmless with regard to abrasion.

The air treatment system 40, which is schematically illustrated in FIG. 1, has an inlet 41 for the discharged air 42 from the chamber 11. The discharged air 42 is fed to a filter unit 43 in which the dust particles are separated from the air flow. The air 44 filtered in this manner reaches a water separator 45. There, heat is extracted from the air flow 44 so that water condenses. The filtered and dried air flow 46 is heated in an air heating device 47 and brought to the temperature desired for drying the seeds in the chamber 11. The cleaned, dried and heated air 48 leaves the air treatment system 40 at an outlet 49. The outlet 49 is connected to the air duct 17 through which the heated air 48 flows into the chamber 11 through the perforated metal sheet 18.

In addition, the outlet 49 can be connected to an annular gap 39, if the gap is provided, which is located between the cylindrical housing part 15 and the rotating housing part 12. Thus, the cleaned, dried and heated air 48 is able to get into the chamber 11 through the annular gap 39. On the one hand, by feeding the conditioned air 48 through the annular gap 39, an undesired escape of discharged air 42 through the annular gap 39 can be prevented, and, on the other hand, the drying of the seeds can be improved further.

The invention claimed is:

1. A device for coating seeds with a liquid dressing solution, comprising:
    a housing (10) delimiting a chamber (11) having a vertical axis (1) extending in the direction of gravity and configured to accommodate the seeds;
    a rotating system for mixing the seeds and the dressing solution;
    an air duct (17) configured to feed heated air into the chamber (11); and
    a separating unit which is permeable to the heated air and separates the air duct (17) from the chamber (11), the separating unit comprising at least one perforated metal sheet (18) having an inner face (31) facing towards the chamber (11), an outer face (30) facing towards the air duct (17) and a plurality of projections (28), wherein each of the projections (28) is inclined on the outer face (30) and rises obliquely in a direction of the outer face (30), and each of the projections (28) includes an opening inlet (34) disposed toward the air duct (17) to receive the heated air and an opening outlet (35) disposed toward the chamber (11);
    wherein the housing (10) comprises a substantially cylindrical housing part (15) partially enclosing the chamber (11), with the perforated metal sheet (18) being inserted into a jacket surface of the cylindrical housing part (15), wherein each of the cylindrical housing part (15) and the perforated metal sheet (18) is disposed about the vertical axis (1) and is a stationary housing part that does not move about the vertical axis (1) during operation of the device, and wherein the housing (10) comprises a rotatable housing part (12) partially enclosing the chamber (11) and disposed about the vertical axis below the stationary cylindrical housing part (15), the rotatable housing part (12) configured to rotate about the vertical axis (1) during the operation of the device to mix the seeds and the liquid dressing solution and introduce seeds upwards into the stationary substantially cylindrical housing part (15) and into the heated air directed in a circumferential direction (32).

2. The device according to claim 1, wherein the rotatable housing part (12) substantially has a shape of a truncated cone oriented in a downward direction.

3. A method for coating seeds using a device according to claim 1, wherein the rotating system for mixing seeds and dressing solution are set in rotation, wherein the seeds are moved along the inner face (31) of the perforated metal sheet (18) by the rotating system, and wherein the obliquely rising projections (28) substantially oppose a main direction of movement (32) of the seeds, so that it is prevented that the seeds hit sharp edges while moving along the inner face (31) of the metal sheet (18).

4. The device according to claim 1, wherein a main axis (38) of the projection (28) substantially extends in a circumferential direction of the jacket surface of the cylindrical housing part (15) and the opening inlet (34) of the inlet is disposed toward and facing a direction of flow (33) of the hot air.

5. The device according to claim 1, wherein the cross section of the opening inlet (34) of the projection (28) is substantially triangular or semi-elliptical.

6. The device according to claim 1, wherein the projection (28) is substantially triangular or semi-elliptical in a top view.

7. The device according to claim 1, wherein the air duct (17) is configured as an annular duct extending in the circumferential direction around the jacket surface of the cylindrical housing part (15).

8. The device according to claim 1, wherein the perforated metal sheet (18) is a ring segment.

9. The device according to claim 1, wherein the housing (10) comprises a lid (16) disposed at an upper rim of the cylindrical housing part (15).

10. The device according to claim 1, wherein at least one guide vane is provided for the seeds located in the chamber (11).

11. The device according to claim 1, wherein a rotating disc atomizer (20) is provided for atomizing the liquid dressing solution.

12. The device according to claim 1, wherein an air treatment system (40) is provided that has an inlet (41) for discharged air (42) from the chamber (11) and an outlet (49) connected to the air duct (17).

13. A method for coating seeds using a device according to claim 1, wherein the rotating system for mixing seeds and dressing solution are set in rotation, wherein the seeds are moved along the inner face (31) of the perforated metal sheet (18) by the rotating system, and wherein the obliquely rising projections (28) substantially oppose a main direction of movement (32) of the seeds, so that it is prevented that the seeds hit sharp edges while moving along the inner face (31) of the metal sheet (18).

14. The device according to claim 1, wherein the cylindrical housing part (15) comprises more than one air duct inlet (26) of the air duct (17).

15. The device according to claim 1, wherein the substantially cylindrical housing part (15) includes a lid (16) at a first end and is open toward the rotatable housing part (12) at a second end opposite the first end.

16. The device according to claim 1, wherein the rotatable housing part (12) comprises a truncated cone including an upper rim adjacent the second end of the substantially cylindrical housing part (15), and a cone envelope surface extending downward from the upper rim and inward toward the vertical axis.

17. The device according to claim 1, wherein a main axis (38) of each of the plurality of projections (28) substantially extends in a circumferential direction of the substantially cylindrical housing part (15) at a non-parallel angle to the vertical axis.

18. The device according to claim 1, wherein a cross section of the opening inlet (34) each of the plurality of projections (28) is substantially triangular or semi-elliptical.

19. The device according to claim 1, wherein the air duct (17) is configured as an annular duct extending in a circumferential direction about the substantially cylindrical housing part (15) and the vertical axis.

20. The device according to claim 1, wherein the perforated sheet (18) is a ring segment partially extending about the vertical axis.

21. The device according to claim 1, wherein at least one guide vane is provided for the seeds and located in the chamber (11).

22. The device according to claim 21, wherein an inner space of the guide vane forms a part of the air duct and that the perforated sheet (18) is inserted into an outer wall of the guide vane.

23. The device according to claim 1, wherein a rotating disc atomizer (20) is disposed within the chamber (11) and configured to atomize the liquid dressing solution.

24. The device according to claim 1, further comprising an air treatment system (40) including an inlet (41) configured to receive discharged air (42) from the chamber (11) and an outlet (49) connected to the air duct (17).

25. The device according to claim 1, wherein upon contact with the heated air in the stationary substantially cylindrical housing part (15) the seeds slide or rub along the at least one perforated sheet (18) in the circumferential direction and fall back into the rotating housing part (12).

* * * * *